(No Model.)
R. A. GILCHRIST.
FOOD PRESERVING JAR.
No. 536,870. Patented Apr. 2, 1895.
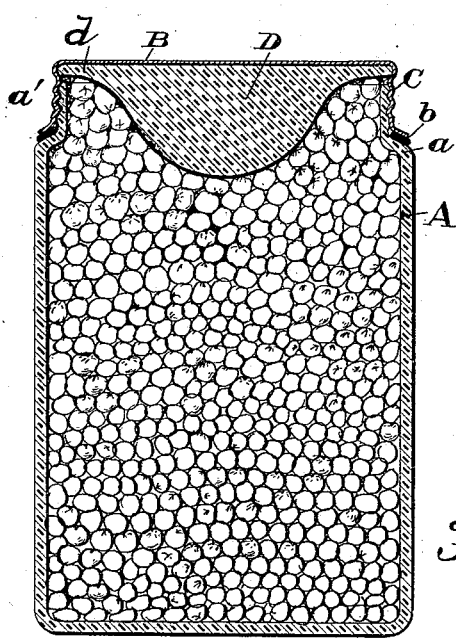
Fig. 1
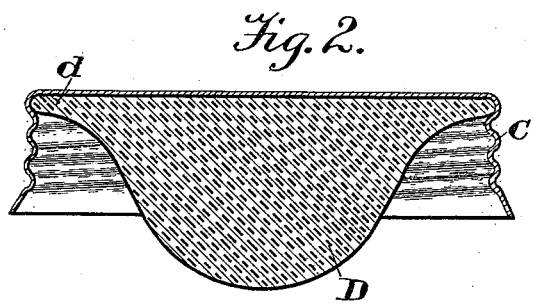
Fig. 2.
WITNESSES
INVENTOR
Ruth A. Gilchrist.
By
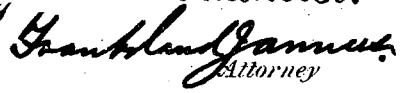
Attorney

UNITED STATES PATENT OFFICE.

RUTH A. GILCHRIST, OF WILKES-BARRÉ, PENNSYLVANIA.

FOOD-PRESERVING JAR.

SPECIFICATION forming part of Letters Patent No. 536,870, dated April 2, 1895.

Application filed July 30, 1894. Serial No. 518,987. (No model.)

*To all whom it may concern:*

Be it known that I, RUTH A. GILCHRIST, a citizen of the United States, residing at Wilkes-Barré, in the county of Luzerne and State of Pennsylvania, have invented certain new and useful Improvements in Food-Preserving Jars, of which the following is a description, reference being had to the accompanying drawings, and to the letters of reference marked thereon.

My invention relates to covers for jars, such as are generally used for preserving fruit, food, meat, and other substances; and the object of the improvement is to simplify the construction of the cover, and render it capable of expelling atmospheric air, afford room for the fruit or other article which is displaced, in order to expel the air; and also seal the jars air-tight without any room remaining in the jar for air to occupy.

My invention consists in a novel cover, comprising only two parts, for jars for preserving fruit, meat and other substances; and it also consists in the combination of the said cover, and a jar for preserving fruit, meat, and other substances.

My invention will be more fully understood from the following specification and claims, in connection with the accompanying drawings.

In the drawings Figure 1 is a sectional elevation showing my improved cover and a jar, the jar being represented as filled and hermetically sealed. Fig. 2 is an enlarged detail view of the cover shown in Fig. 1.

In Fig. 1 A represents a preserving jar which may be of glass or other suitable material. A shoulder $a$ is formed near the upper edge of the body portion of the jar, to receive an elastic washer or gasket $b$, and the exterior of the jar above the shoulder $a$ is screw threaded as indicated at $a'$. The relative diameters of the body portions of the jar, and the neck portion thereof are, preferably, substantially as represented—that is, the diameter of the neck and mouth of the jar is nearly equal to the diameter of that portion of the jar which is below the shoulder $a$. The preferable form of the jar and its neck is cylindrical, or circular with vertical sides. The screw thread of the jar is preferably formed integral with the neck of the jar.

The cover, comprising portions B, C, and D $d$ is constructed as follows: The portion B C, is made of metal in form of a flat disk designated by the letter B with a depending flange designated by C. The flange is screw threaded by swaging, and is adapted to match the threads $a$ on the jar. The flange, is preferably, flared in order to make a good tight joint contact with the jar. The portion D $d$, constitutes a lining to the metallic portion just described, and is preferably made of porcelain or other like non-corrodible material. At its top it is of a diameter sufficient to extend entirely over the under side of the metal portion B, and from its under side depends a central conical projection. This projection starts downward from a thin, broad, annular flange $d$ of the lining portion. The lining D is fastened by its flange to the metal portion B, by inserting it into the metal portion B C, after the screw $a'$ is swaged upon the portion C, by swaging the metal down upon the flange. The conical portion of the lining is of considerably less diameter than the flange portion thereof, and therefore a large annular reception chamber is formed between the surface of the conical portion and the inner surface of the upper portion of the jar. The conical portion is made of a greater depth than the screw thread on the jar, in order that it may enter deep enough into the fruit or mass of food inclosed in the jar, before the joint at the shoulder $a$ is hermetically sealed by the edge of the portion C resting firmly against the gasket on the shoulder $a$. This construction of the cover insures the complete expulsion of the air from the jar, and its free escape along the line of the screw threads $a'$, $a^2$, while the annular chamber between the conical projection of the portion B and the jar, is filled completely by the fruit, meat, or other substance which is displaced by the descent of the conical projection; said displaced substance being so completely compacted in the chamber and the air so effectually expelled that no space for air remains within the jar.

When the cover is applied to the jar, the conical portion acts to press outward and upward, and displace a part of the contents of the jar and expel all air that may exist in the jar between the cover and contents of the jar, thereby completely filling the space between the cover and the contents of the jar. The object of the expulsion of the air and the complete filling of the jar is to prevent the deterioration or decay of the fruit, meat, or other edible inclosed in the jar, which takes place when air is present and the jar not packed completely full.

It is important in order to accomplish the complete filling of the jar from its bottom to its top, or cover, with the fruit, meat, or other substance, to relatively proportion the diameters of the conical projection and the diameter of the upper portion of the jar, and this relative proportion must be such that a sufficiently capacious annular chamber shall be formed between the circumference of the conical projection and the surface of the upper portion of the jar for containing all of the displaced substances, and said chamber must be large enough for the free movement into it of the displaced portion of the fruit, meat, or other substance, and the same must be permitted to enter between the surface of the upper portion of the jar and the conical projection, and also to be crowded by the action of the conical surface, up against the annular lateral flange of the lining, and thus insure that every portion of the room of the chamber is filled and all atmospheric air expelled from the jar. I therefore have reduced the diameter of the inverted conical projection very greatly from the point where the flange connects with the screw threaded metal portion of the cover, down to its inverted apex; and to facilitate the evolution of the fruit or meat, or other substance during the penetration of the conical projection into the mass, I have made the outline of the conical projection, approximately, a cyma united to a rounded apex as this form enables the meat, or other substance to rise into the chamber and roll over until the chamber is completely filled and all air is expelled.

By my invention the chamber is filled with displaced fruit, meat, or other substance, and not by a solid plug having a narrow annular tapered air space between its circumference and the neck of the jar. When only a narrow air space is formed, as just stated, between a plug and the neck of the jar, the fruit, or meat cannot get into such space, and consequently a portion of the air which ought to be expelled, remains in this space, and this air eventually ruins the article inclosed in the jar for preservation.

What I claim is—

1. The within described improved new article of manufacture, viz: a preserve jar cover formed of a screw threaded outer metallic sealing portion, and a non-corrodible lining portion, the two parts being constructed and united as follows: each part being provided with integral uniting projections, the upper part of the said lining portion having a diameter about equal to that of the under surface of the top of the outer metal portion, and provided with a downwardly extending inverted conical projection of much less diameter than the top surface of the lining portion, and of a greater depth than the height of that portion of the cover which is screw threaded; whereby a preserving jar cover is provided, comprising simply two united parts, the inner one of which is formed with a thin annular flange by which it is connected to the outer screw threaded metallic portion; the said cover when applied to a jar acting upon the inclosed substances so as to cause them to entirely occupy the inside area of the jar from top to bottom, and thereby all atmospheric air to be expelled from the jar, and finally hermetically sealing the jar by screw pressure on the gasket of the shoulder, substantially as described.

2. The within described new article of manufacture, viz: a cover for a fruit, meat, or other preserving jar, consisting of the sheet metal screw threaded portion B C, and the lining portion D d, the said lining portion having an annular flange and a downwardly extending conical projection, substantially as described.

3. In combination with a jar for preserving fruit, meat or other substances, having a gasket-shoulder, a screw threaded neck portion of nearly an equal diameter with its body portion, a cover consisting of the sheet metal screw threaded portion B C, and the lining portion D, d having an annular flange and a downwardly extending conical projection, substantially as described.

In testimony whereof I hereto affix my signature in presence of two witnesses.

RUTH A. GILCHRIST.

Witnesses:
FRANK D. BLACKISTONE,
FRANKLAND JANNUS.